United States Patent
Baumgartner et al.

(10) Patent No.: US 12,385,763 B2
(45) Date of Patent: Aug. 12, 2025

(54) SENSOR ARRANGEMENT FOR REDUNDANT DETERMINATION OF AN ANGLE OF ROTATION OF A BODY WHICH IS ROTATABLE ABOUT AN AXIS OF ROTATION

(71) Applicant: Robert Bosch GmbH, Stuttgart (DE)

(72) Inventors: Andreas Baumgartner, Auenstein (DE); Bernd Tepass, Beilstein (DE); Peter Muehlbeyer, Ilsfeld (DE); Sina Fella, Neuenstadt (DE); Stefan Kuntz, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 18/352,304

(22) Filed: Jul. 14, 2023

(65) Prior Publication Data
US 2024/0019273 A1    Jan. 18, 2024

(30) Foreign Application Priority Data
Jul. 18, 2022    (DE) .................. 10 2022 207 284.7

(51) Int. Cl.
*G01D 5/20*    (2006.01)

(52) U.S. Cl.
CPC .................. *G01D 5/2046* (2013.01)

(58) Field of Classification Search
CPC . G01D 5/20; G01D 5/56; G01L 3/105; G01L 3/1435
See application file for complete search history.

(56) References Cited

U.S. PATENT DOCUMENTS

| | | | |
|---|---|---|---|
| 2009/0276180 A1* | 11/2009 | Schneider | G01D 5/58 356/614 |
| 2023/0332965 A1* | 10/2023 | Casu | G01D 3/08 |

FOREIGN PATENT DOCUMENTS

DE    10 2019 121 759 A1    2/2020

\* cited by examiner

*Primary Examiner* — Alesa Allgood
(74) *Attorney, Agent, or Firm* — Maginot, Moore & Beck LLP

(57) ABSTRACT

A sensor arrangement for redundant determination of an angle of rotation of a body about an axis of rotation includes at least one circuit carrier, a first sensor device having a first ECU and a second ECU. A magnet of the first sensor device and a coupling device of the second sensor device are each coupled in a rotationally fixed manner to the rotatable body. The first ECU is designed to receive signals caused by the rotational movement of the magnet and to generate at least one first electrical measurement signal which represents the current angle of rotation of the rotatable body. The second ECU is designed to receive signals caused by the rotary movement of the coupling device and to generate at least one redundant second electrical measurement signal which represents the current angle of rotation of the rotatable body.

15 Claims, 3 Drawing Sheets

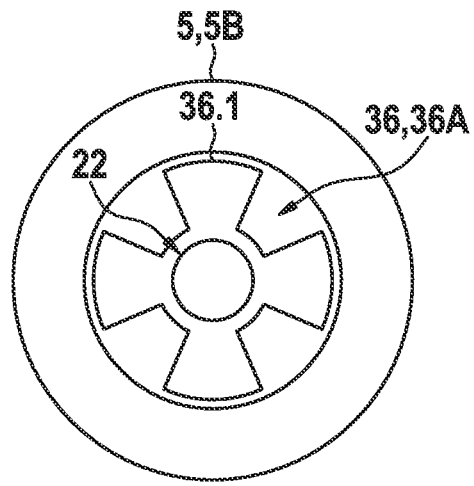
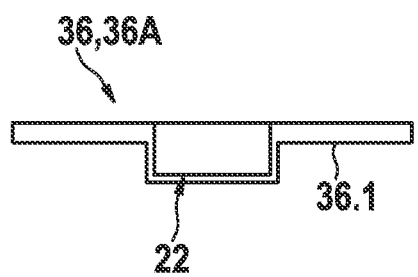
Fig. 5
Fig. 6
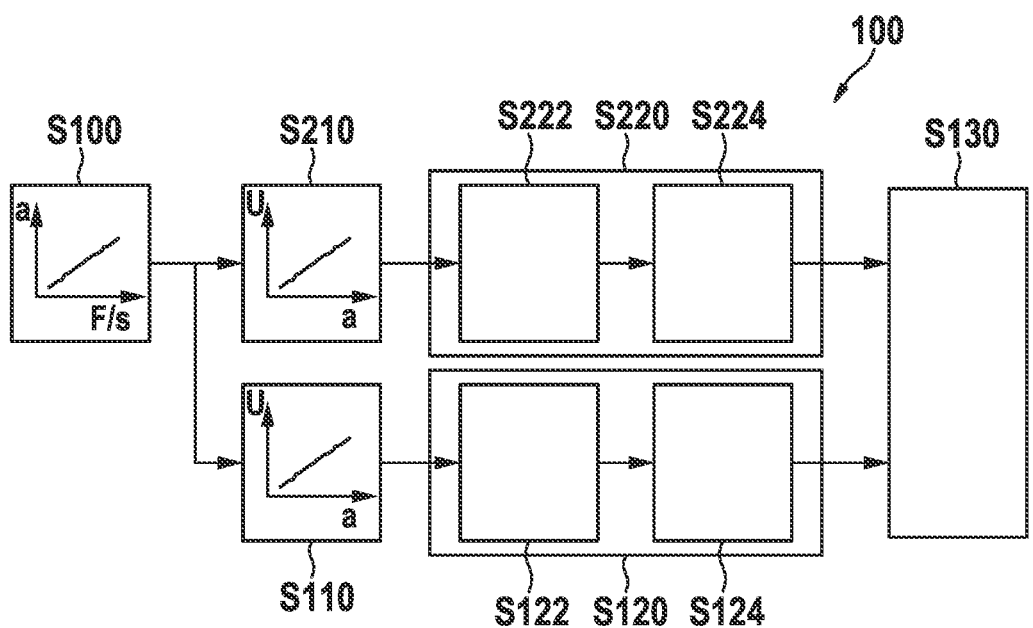
Fig. 7

SENSOR ARRANGEMENT FOR REDUNDANT DETERMINATION OF AN ANGLE OF ROTATION OF A BODY WHICH IS ROTATABLE ABOUT AN AXIS OF ROTATION

This application claims priority under 35 U.S.C. § 119 to patent application number DE 10 2022 207 284.7, filed on Jul. 18, 2022 in Germany, the disclosure of which is incorporated herein by reference in its entirety.

The disclosure relates to a sensor arrangement for redundant determination of an angle of rotation of a body which is rotatable about an axis of rotation. The disclosure also provides a method for redundantly determining an angle of rotation of a body which is rotatable about an axis of rotation, which method is able to be performed by such a sensor arrangement.

BACKGROUND

Based on the prior art, it is known to determine a rotation angle of a body which is rotatable around a rotation axis by using corresponding sensor arrangements. Such sensor arrangements are, e.g., used as pedal travel sensors in an accelerator pedal, also known in technical terms as an accelerator lever or accelerator pedal, which is a control element of vehicles with which the engine power can be regulated. It is located in the footwell of the driver's seat area and is usually operated with the right foot. In modern vehicles, the accelerator pedal no longer acts mechanically directly via linkage or cable, but via the engine control system on throttle elements or the injection system. When used in electric vehicles, the electrically generated vehicle power is controlled by a pressure-proportional electrical variable. Alternatively, such a sensor arrangement can also be used with a brake pedal, including a foot brake lever, which serves as the actuating device of the vehicle's service brake system. The foot force of the driver is in this case initially boosted in order to generate sufficient braking pressure with the available pedal travel. The boost is generated by the lever system of the foot brake lever. With appropriate dimensioning, an approximately 5-fold increase in foot force can already be achieved in this case. In today's vehicles, however, this is not sufficient to brake a vehicle or bring it to a halt, so a further boost is provided by a brake booster. In addition, solutions are known from the prior art in which the accelerator pedal is combined with the brake pedal to form a control lever in order to relieve the driver and cope with the increasing traffic density. The pedal value sensor can, e.g., be implemented as a double potentiometer or also via other sensor principles, e.g. using Hall elements.

Known from DE 10 2019 121 759 A1 is a braking device for a vehicle, which device comprises a pedal travel sensor unit that senses a pedal travel of a brake pedal and outputs a pedal travel signal; and a control unit that controls a brake actuator for braking the vehicle based on the pedal travel signal output from the pedal travel sensor unit and outputs a ramp signal. The pedal travel sensor unit can sense a rotation angle of a pedal arm based on a zero point, and output the pedal travel signal as a PWM signal based on the sensing result.

SUMMARY

The sensor arrangement for redundant determination of an angle of rotation of a body which is rotatable about an axis of rotation having the features disclosed herein has the advantage that a heterogeneous redundancy for the resolution of a rotational movement of the body rotatable about an axis of rotation can be achieved by a combination of a magnetic measuring principle and an inductive measuring principle. Preferably, embodiments of the sensor arrangement according to the disclosure can be used to resolve rotational movements that do not exceed a rotation of 360°.

Embodiments of the present disclosure provide a sensor arrangement for redundant determination of an angle of rotation of a body rotatable about an axis of rotation, which comprises at least one circuit carrier, a first sensor device which comprises a first evaluation and control unit arranged on the at least one circuit carrier, and is designed to detect the angle of rotation of the body rotatable about the axis of rotation based on a magnetic measuring principle, and a second sensor device which comprises a second evaluation and control unit arranged on the at least one circuit carrier and is designed to detect the angle of rotation of the body rotatable about the axis of rotation based on an inductive measuring principle. In this case, a magnet of the first sensor device and a coupling device of the second sensor device are each non-rotatably coupled to the rotatable body. The first evaluation and control unit is designed to receive signals caused by the rotational movement of the magnet and to generate at least a first electrical measurement signal representing the current angle of rotation of the rotatable body. The second evaluation and control unit is designed to receive signals caused by the rotational movement of the coupling device and to generate at least one redundant second electrical measurement signal representing the current angle of rotation of the rotatable body.

Also proposed is a method for redundantly determining an angle of rotation of a body rotatable about an axis of rotation, which can be performed by such a sensor arrangement. In this case, a change in the angle of rotation of the body rotatable about the axis of rotation caused by a force or a displacement is detected based on a magnetic measuring principle and based on an inductive measuring principle and converted in each case into at least one corresponding electrical measuring signal. At least one first electrical measurement signal is generated and processed via the magnetic measurement principle, and at least one redundant second electrical measurement signal is generated and processed via the inductive measurement principle. The processed at least one first electrical measurement signal and the processed at least one second electrical measurement signal are evaluated together for redundant determination of the current angle of rotation of the rotatable body.

Since the magnetic measuring principle and the inductive measuring principle resolve purely the angles of rotation, embodiments of the sensor arrangement according to the disclosure can be implemented independently of a project-specific force-displacement characteristic of the mechanics of the pedals. As a result, embodiments of the sensor arrangement according to the disclosure can be used flexibly and can be adapted or used for different pedals, e.g., for an accelerator pedal or for a brake pedal or for a combined accelerator and brake pedal with different angular ranges, with the rotatable body corresponding to a rotatably mounted pedal lever. Doing so enables brake signals or acceleration signals to be provided without mechanical penetration. Furthermore, the hardware can be easily adapted to customer-specific requirements by means of assembly variants. Depending on the customer's requirements, a separate plug-in connection or a common plug-in connection on the at least one circuit carrier can also be provided for each measuring principle.

The term "evaluation and control unit" can in this context be understood to mean an electrical assembly or electrical circuit that processes or evaluates the detected sensor signals. The first evaluation and control unit and the second evaluation and control unit can preferably each be designed as an ASIC module (ASIC: application-specific integrated circuit). In addition, the magnetic measuring principle used and the inductive measuring principle used are each based on a differential measuring principle in order to optimize the electromagnetic compatibility (EMC) of the sensor arrangement. In other words, the differential measuring principle is used when customer requirements regarding electromagnetic compatibility (EMC) are high. Depending on the EMC load in the area of the rotating body, a non-differential measuring principle can also be used. The evaluation and control unit can comprise at least one interface, which can be designed in the form of hardware and/or software. In a hardware design, the interfaces can, e.g., be part of the ASIC element. However, it is also possible that the interfaces be separate integrated circuits, or consist at least in part of discrete components. In a software design, the interfaces can, e.g., be software modules provided on a microcontroller in addition to other software modules.

It is particularly advantageous that the first sensor device can be designed as a magnetic sensor with a magnetic angle sensor element facing the rotatable magnet and integrated into the first evaluation and control unit. Doing so enables a particularly space-saving implementation of the first sensor device.

In one advantageous embodiment of the sensor arrangement, the second sensor device can be designed as an inductive sensor with at least one excitation structure and at least one reception structure facing the rotatable coupling device. For example, the at least one excitation structure can be coupled to at least one oscillator circuit that couples a periodic alternating signal to the at least one excitation structure during operation. The coupling device can be designed to affect an inductive coupling between the at least one excitation structure and the at least one receiving structure. In addition, the at least one receiving structure can comprise at least one receiving coil having a periodically repeating loop structure. The inductive measurement principle can be homogeneously redundant by duplicating the receiver structures on the at least one circuit carrier itself. For measurement, both receiver structures can use the same coupling device. In conjunction with the magnetic measuring principle, this results in a total of threefold redundancy when using only one circuit carrier. As a result, in case of a detected non-plausibility of the measurement signals, a selection procedure can be performed to increase the availability of the system.

In a further advantageous embodiment of the sensor arrangement, the at least one circuit carrier can be arranged in the axis of rotation of the rotatable body. In this case, the rotary axis can be achieved via two rotary bearings. This means that the at least one circuit carrier can preferably be arranged between the two rotary bearings and designed as a multilayer printed circuit board. In addition, the at least one circuit carrier can preferably be designed such that a separate voltage supply and/or ground supply for the individual measuring principles is possible, e.g., by using multiple layers and copper areas.

In a further advantageous embodiment of the sensor arrangement, the first evaluation and control unit and the second evaluation and control unit can be arranged on different sides of the at least one circuit carrier. In this case, the magnet can be connected to a first rotary bearing and the coupling device can be connected to a second rotary bearing. Alternatively, the first evaluation and control unit and the second evaluation and control unit can be arranged together on one side of the at least one circuit carrier. In this case, the magnet and the coupling device can be connected together to one of the rotary bearings, with the magnet preferably being integrated into the coupling device. Doing so enables a particularly space-saving implementation of the sensor arrangement according to the disclosure.

In another advantageous embodiment of the sensor arrangement, the magnet can be multipolar and the coupling device can comprise a certain number of electrically conductive coupling segments. In this case, a first periodicity of the first electrical measurement signal is based on a number of poles of the magnet and a second periodicity of the second measurement signal is based on the number of electrically conductive coupling segments. For example, the number of electrically conductive coupling segments can correspond to the first periodicity of the first measurement signal. In addition, the number of pole pairs of the magnet can correspond to the second periodicity of the second measurement signal. For example, the magnet used can be a circular thin disk. Of course, the magnet can also have a different shape and be, e.g., oval or angular, etc. Preferably, a multipole magnet can be used. Depending on the signal resolution requirement, the number of pole pairs can be adjusted. The magnet can be mounted in one of the rotary bearings. When the pedal lever is operated, the magnet rotates. The evaluation and control unit on the at least one circuit carrier detects the signal from the now rotating magnet and converts the rotation into an electrical signal with information about the angle of rotation or the deflection of the pedal lever. The coupling device for the inductive measuring principle, which can also be referred to as a target, can preferably be designed as a rotor with a certain number of blades as electrically conductive coupling segments and typically be made of aluminum. However, other conductive materials can also be used. The number of blades can be adjusted to the requirements of the angular range being resolved. Preferably, the periodicity is increased as far as the required uniqueness range of the angle of rotation being detected allows. Like the magnet, the coupling device can be attached to a rotary bearing. The rotation of the coupling device can be resolved by the at least one receiving structure and the second evaluation and control unit on the at least one circuit carrier and converted into at least one electrical measurement signal.

In a further advantageous embodiment of the sensor arrangement, the periodicity of the first electrical measurement signal and the periodicity of the second measurement signal can differ so that a Nonius principle can be implemented. For example, a uniqueness range of the angle of rotation being determined defined by the periodicities of the coupling device and the magnet can be specified such that detectable angle of rotation ranges of the first sensor device and the second sensor device each inherently and completely cover a specified angle range of the angle of rotation being determined. Doing so enables the Nonius principle to increase the resolution of the calculated Nonius rotation angle by mathematically combining the rotation angle determined by the inductive measurement principle and the rotation angle determined by the magnetic measurement principle. In case of failure of one of the measuring principles, the angle of rotation of the rotatable body can still be provided directly by one of the two measuring principles with reduced resolution.

Alternatively, the uniqueness range of the angle of rotation being determined can be specified by the periodicities of the coupling device and the magnet such that detectable angle of rotation ranges of the first sensor device and the second sensor device are each inherently smaller than a specified angle range of the angle of rotation being determined. As a result, the Nonius principle can increase the resolution of the calculated angle and also allow smaller angular errors due to the higher possible periodicity of the individual measuring principles. If one of the measuring principles fails, the angle of rotation of the rotatable body can no longer be determined unambiguously, but can be corrected to a unique angle by "counting along" in the evaluation and control unit(s) until the failure is corrected.

Exemplary embodiments of the disclosure are illustrated in the drawings and explained in greater detail in the subsequent description. In the drawings, identical reference characters refer to components or elements performing identical or similar functions.

BRIEF DESCRIPTION OF THE DRAWINGS

FIG. 5 shows a schematic representation of a rotary bearing with an exemplary embodiment of a coupling device with an integrated magnet of the sensor arrangement according to the disclosure of FIG. 4.

FIG. 6 shows a schematic sectional view of the coupling device with integrated magnet from FIG. 5.

FIG. 7 shows a block diagram of an exemplary embodiment of a method according to the disclosure for redundantly determining an angle of rotation of a body rotatable about an axis of rotation.

DETAILED DESCRIPTION

Figure 1:
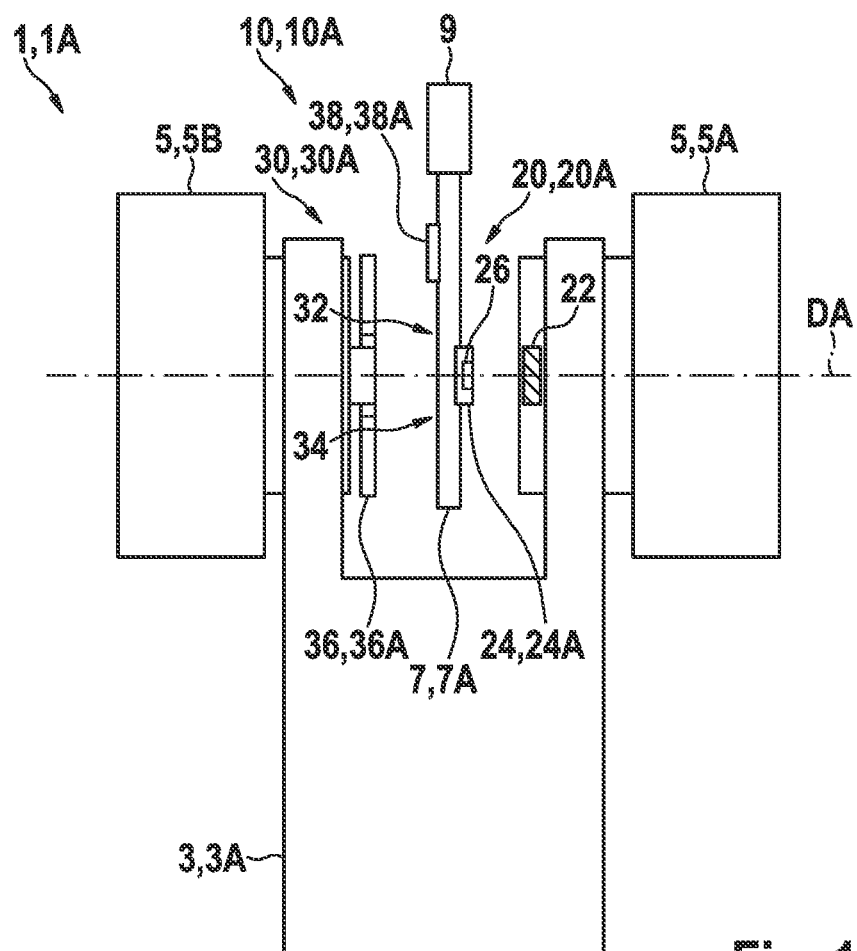
FIG. 1 shows a schematic and sectional view of a pedal for a vehicle with a first exemplary embodiment of a sensor arrangement according to the disclosure for redundantly determining an angle of rotation of a body that is rotatable about an axis of rotation.

As can be seen from FIGS. 1 to 6, the illustrated exemplary embodiments of a sensor arrangement 10, 10A, 10B according to the disclosure for redundantly determining an angle of rotation a of a body 3 rotatable about an axis of rotation DA each comprise at least one circuit carrier 7, a first sensor device 20, which comprises a first evaluation and control unit 24 arranged on the at least one circuit carrier 7 and detects the angle of rotation a of the body 3 rotatable about the axis of rotation DA based on a magnetic measuring principle, and a second sensor device 30 which comprises a second evaluation and control unit 38 arranged on the at least one circuit carrier 7 and detects the angle of rotation a of the body 3 rotatable about the axis of rotation DA based on an inductive measuring principle. In this case, a magnet 22 of the first sensor device 20 and a coupling device 36 of the second sensor device 30 are each non-rotatably coupled to the rotatable body 3. The first evaluation and control unit 24 receives signals due to the rotational movement of the magnet 22 and generates at least a first electrical measurement signal representing the current angle of rotation a of the rotatable body 3. The second evaluation and control unit 38 receives signals caused by the rotational movement of the coupling device 36 and generates at least one redundant second electrical measurement signal representing the current angle of rotation a of the rotatable body 3.

Figure 4:
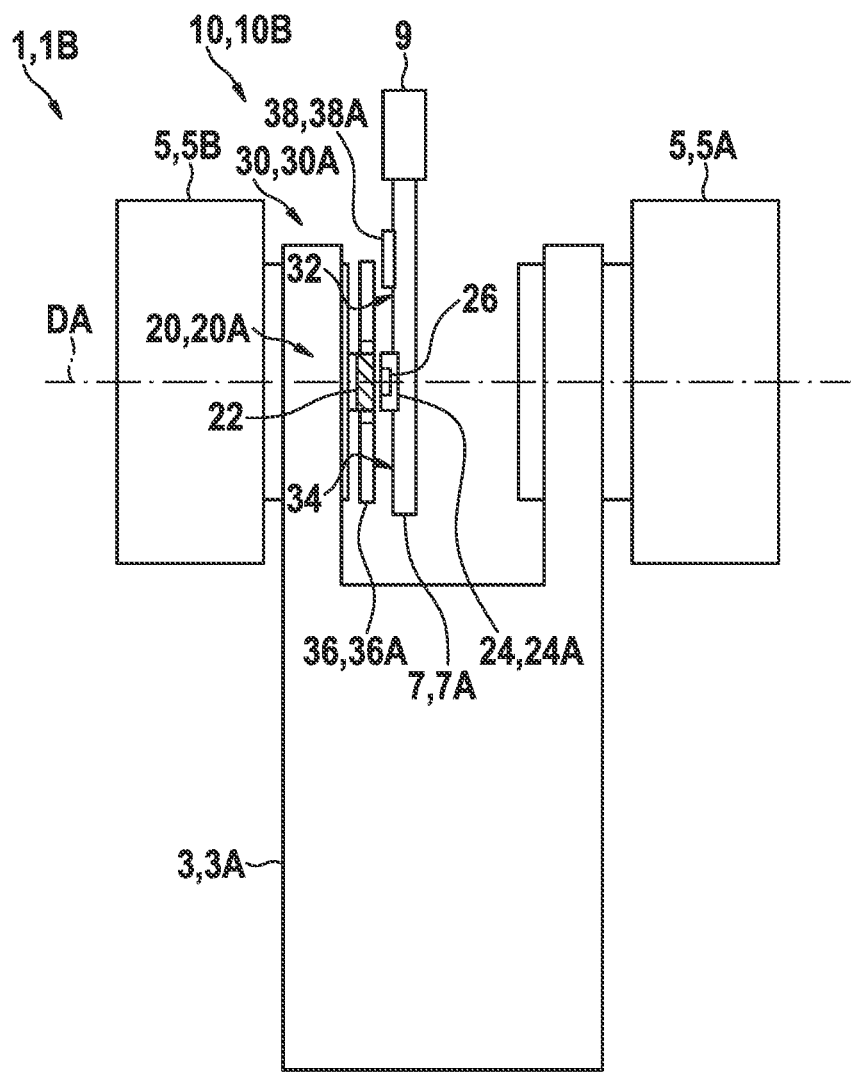
FIG. 4 shows a schematic and sectional view of a pedal for a vehicle with a second exemplary embodiment of a sensor arrangement according to the disclosure for redundantly determining an angle of rotation of a body that is rotatable about an axis of rotation.

As can be further seen in particular from FIGS. 1 and 4, the circuit carrier 7 shown is arranged in the axis of rotation DA of the rotatable body 3, which is implemented via two rotary bearings 5, 5A, 5B. In the illustrated exemplary embodiments, the rotatable body 3 is designed as a pedal lever 3A, wherein legs of a fork-shaped end of the pedal lever 3A are each connected to one of the two rotary bearings 5, 5A, 5B. In the illustrated exemplary embodiment, the circuit carrier 7 is designed as a multilayer printed circuit board 7A. In the illustrated exemplary embodiments, the first evaluation and control unit 24 of the first sensor device 20 and the second evaluation and control unit 38 of the second sensor device 30 are each designed as an ASIC module 24A, 38A and are electrically connected to a higher-level control unit not shown in more detail via a common plug-in connection 9. In the higher-level control unit, the generated measurement signals can be further evaluated to assess the detected rotary motion.

In the illustrated exemplary embodiments of the sensor arrangement 10, 10A, 10B, the first sensor device 20 is formed in each case as a magnetic sensor 20A with a magnetic angle sensor element 26, which faces the rotatable magnet 22 and is integrated in the first evaluation and control unit 24. The second sensor devices 30 is in each case designed as an inductive sensor having at least one excitation structure 34 and at least one receiving structure 32 facing the rotatable coupling device 36.

In the illustrated exemplary embodiments of the sensor arrangement 10, 10A, 10B, the at least one excitation structure 34 is coupled to at least one oscillator circuit not shown in more detail, which is preferably integrated into the first evaluation and control unit 24 and couples a periodic alternating signal into the at least one excitation structure 34 during operation. The at least one excitation structure 34 comprises at least one excitation coil (not shown in detail) and the at least one receiving structure 32 comprises at least one receiving coil (not shown in detail) featuring a periodically repeating loop structure. The coupling device 36 affects an inductive coupling between the at least one excitation structure 34 and the at least one receiving structure 32.

As can be further seen from FIG. 1, in the illustrated first exemplary embodiment of the sensor arrangement 10A, the first evaluation and control unit 24 and the second evaluation and control unit 38 are arranged on different sides of the circuit carrier 7. In this case, the magnet 22 is connected to a first rotary bearing 5A, which is on the right in the illustration, and the coupling device 36 is connected to a second rotary bearing 5B, which is on the left in the illustration. Therefore, the first evaluation and control unit 24 is arranged on the right side of the circuit carrier 7 in the illustration and faces the magnet 22.

Figure 2:
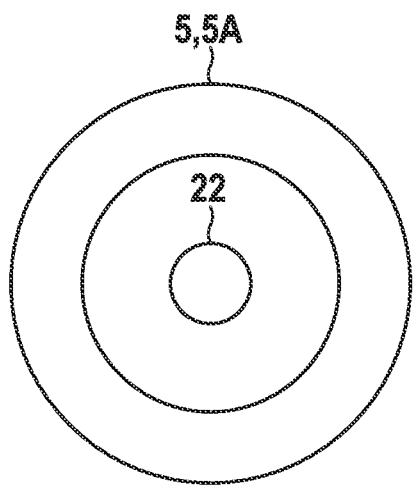
FIG. 2 shows a schematic representation of a first rotary bearing with a magnet of the sensor arrangement according to the disclosure of FIG. 1.
Figure 3:
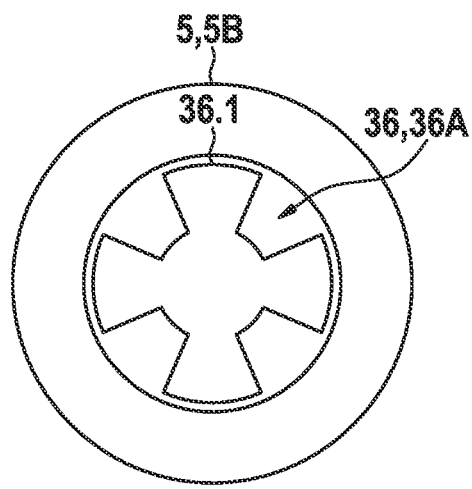
FIG. 3 shows a schematic representation of a second rotary bearing with an exemplary embodiment of a coupling device of the sensor arrangement according to the disclosure of FIG. 1.

As can be further seen in FIG. 2, the multipole magnet 22 is integrated centrally into the first rotary bearing 5A. As can be further seen from FIG. 3, the coupling device 36 is designed as a rotor 36A with four blades as electrically conductive coupling segments 36.1. A periodicity of the first electrical measurement signal is in this case based on a number of poles of the magnet 22 and a periodicity of the second measurement signal is based on the number of electrically conductive coupling segments 36.1 or blades of the rotor 36A.

As can be seen further from FIG. 4, in the illustrated second exemplary embodiment of the sensor arrangement 10B, the first evaluation and control unit 24 and the second evaluation and control unit 38 are arranged together on one side, in this case the left side of the circuit carrier 7. The magnet 22 and the coupling device 36 are in this case jointly connected to the second, here left, rotary bearing 5B, with the magnet 22 being integrated into the coupling device 36, as can be seen in particular in FIGS. 5 and 6.

As can be further seen from FIGS. 5 and 6, the multi-pole magnet 22 is integrated centrally into the second rotary bearing 5B and the coupling device 36 in a manner similar to the first exemplary embodiment of the sensor arrangement 10A. As can be further seen from FIG. 5, the coupling device 36 is designed as a rotor 36A with four blades as electrically conductive coupling segments 36.1, similar to the first exemplary embodiment of the sensor arrangement Again, the periodicity of the first electrical measurement signal is based on the number of poles of the magnet 22, and the periodicity of the second measurement signal is based on the number of electrically conductive coupling segments 36.1 or vanes of the rotor 36A.

In the illustrated exemplary embodiments of the sensor arrangement 10, 10A, 10B, the periodicity of the first electrical measurement signal and the periodicity of the second measurement signal differ, so a Nonius principle can be implemented. For example, the magnet 22 comprises seven pole pairs, so the first measurement signal features a periodicity of seven. The coupling device 36, designed as a rotor 36A, comprises four electrically conductive coupling segments 36.1 or vanes, so the second measurement signal features a periodicity of four. In addition, a uniqueness range of the angle of rotation a being determined defined by the periodicities of the coupling device 36 and the magnet 22 is specified in the illustrated exemplary embodiments such that detectable angle of rotation ranges of the first sensor device 20 and the second sensor device 30 each inherently and completely cover a specified angle range of the angle of rotation a being determined. As a result, the Nonius principle increases the resolution of the calculated Nonius rotation angle by mathematically combining the rotation angle a determined by the inductive measurement principle and the rotation angle a determined by the magnetic measurement principle. If one of the measuring principles fails, then the angle of rotation a of the rotatable body 3 or of the pedal lever 3A can still be provided directly by one of the two measuring principles with reduced resolution.

In alternative exemplary embodiments of the sensor arrangement 10 (not shown), a uniqueness range of the angle of rotation a being determined defined by the periodicities of the coupling device 36 and the magnet 22 is specified such that detectable angle of rotation ranges of the first sensor device 20 and the second sensor device 30 are each inherently smaller than a specified angle range of the angle of rotation a being determined. As a result, the Nonius principle can increase the resolution of the calculated angle of rotation and also enable smaller angular errors due to the higher possible periodicity of the individual measuring principles. If one of the measuring principles fails, then the angle of rotation a of the rotatable body 3 or of the pedal lever 3A can no longer be determined unambiguously, but can be corrected to a unique angle by "counting along" in the evaluation and control units 24, 38 until the failure is corrected.

As can be seen from FIG. 7, the illustrated exemplary embodiment of a method 100 according to the disclosure for redundantly determining an angle of rotation a of a body 3 rotatable about an axis of rotation DA, which can be performed by the sensor arrangement 10, 10B described hereinabove comprises a step S100 in which a force F or a path deflection causes a change in an angle of rotation a of the body 3 rotatable about the axis of rotation DA. In step S110, the angle of rotation a of the rotatable body 3 is detected based on a magnetic measurement principle and converted into at least one corresponding first electrical measurement signal. In parallel step S210, the angle of rotation a of the rotatable body 3 is redundantly detected based on an inductive measurement principle and converted into at least one corresponding second electrical measurement signal. In step S120, the at least one first electrical measurement signal generated via the magnetic measurement principle is processed. In parallel step S220, the at least one second electrical measurement signal generated via the inductive measurement principle is processed. In step S130, the processed at least one first electrical measurement signal and the processed at least one second electrical measurement signal are evaluated together for redundantly determining the current angle of rotation a of the rotatable body 3.

As can be further seen from FIG. 7, in step S110 and in step S210, the detected rotation angles are each converted into a voltage U. To process the measurement signals, they can be digitized, for example, by an analog-to-digital converter in a step S122 or in a step S222. The digital data can then be adapted to an appropriate transmission protocol by appropriate drivers in a step S124 or in a step S224 and transmitted to the higher-level control device, which performs the evaluation in step S130. For example, the SENT transmission protocol (Single Edge Nibble Transmission) can be used as a transmission protocol.

The invention claimed is:

1. A sensor arrangement for redundant determination of an angle of rotation of a rotatable body which is rotatable about an axis of rotation, said arrangement comprising:
    at least one circuit carrier;
    a first sensor device comprising:
        a magnet rotationally fixedly coupled to the rotatable body; and
        a first evaluation and control unit arranged on the at least one circuit carrier, the first evaluation and control unit configured to receive signals caused by the rotational movement of the magnet and to generate at least one first electrical measurement signal which represents a current angle of rotation of the rotatable body detect so as to detect the angle of rotation of the rotatable body based on a magnetic measuring principle; and
    a second sensor device comprising:
        a coupling device rotationally fixedly coupled to the rotatable body; and
        a second evaluation and control unit arranged on the at least one circuit carrier, the second evaluation and control unit configured to receive signals caused by rotational movement of the coupling device and to generate at least one redundant second electrical measurement signal which represents the current angle of rotation of the rotatable body so as to detect the angle of rotation of the rotatable body based on an inductive measuring principle.

2. The sensor arrangement according to claim 1, wherein the first sensor device is configured as a magnetic sensor comprising a magnetic angle sensor element facing the magnet and integrated into the first evaluation and control unit.

3. The sensor arrangement according to claim 1, wherein the second sensor device is designed as an inductive sensor comprising at least one excitation structure and at least one reception structure facing the rotatable coupling device.

4. The sensor arrangement according to claim 3, wherein:
the at least one excitation structure is coupled to at least one oscillator circuit, which, during operation, couples a periodic alternating signal into the at least one excitation structure, and
the coupling device is configured to influence an inductive coupling between the at least one excitation structure and the at least one receiving structure.

5. The sensor arrangement according to claim 3, wherein the at least one receiving structure comprises at least one receiving coil having a periodically repeating loop structure.

6. The sensor arrangement according to claim 1, wherein the at least one circuit carrier is arranged in the axis of rotation of the rotatable body, and the axis of rotation is implemented via two rotary bearings.

7. The sensor arrangement according to claim 1, wherein the first evaluation and control unit and the second evaluation and control unit are arranged on different sides of the at least one circuit carrier.

8. The sensor arrangement according to claim 7, wherein the magnet is connected to a first rotary bearing, and the coupling device is connected to a second rotary bearing.

9. The sensor arrangement according to claim 1, wherein the first evaluation and control unit and the second evaluation and control unit are arranged together on one side of the at least one circuit carrier.

10. The sensor arrangement according to claim 9, wherein:
the magnet and the coupling device are jointly connected to a rotary bearing, and
the magnet is integrated into the coupling device.

11. The sensor arrangement according to claim 1, wherein:
the magnet is multipolar,
the coupling device comprises a number of electrically conductive coupling segments,
a periodicity of the first electrical measurement signal is based on a number of poles of the magnet, and
a periodicity of the second measurement signal is based on the number of electrically conductive coupling segments.

12. The sensor arrangement according to claim 11, wherein the periodicity of the first electrical measurement signal and the periodicity of the second measurement signal differ such that a Nonius principle is implemented.

13. The sensor arrangement according to claim 12, a uniqueness range for the angle of rotation, which is defined by the periodicities of the first and second measurement signals is specified such that detectable angle-of-rotation ranges of the first sensor device and of the second sensor device each inherently and completely cover a specified angle range for the angle of rotation being determined.

14. The sensor arrangement according to claim 12, wherein a uniqueness range of the angle of rotation, which is defined by the periodicities of the first and second measurement signals, is specified such that detectable angle of rotation ranges of the first sensor device and of the second sensor device are each inherently smaller than a specified angle range of the angle of rotation being determined.

15. A method of operating the sensor arrangement as recited in claim 1 for the redundant determination of the angle of rotation of the rotatable body, the method comprising:
detecting a change in the angle of rotation of the rotatable body caused by a force or a displacement based on the magnetic measuring principle;
detecting the change in the angle of rotation on the basis of an inductive measuring principle;
converting the detected change on the basis of the magnetic measuring principle into the at least one first electrical measuring signal, wherein the at least one first electrical measuring signal is generated and processed via the magnetic measuring principle, and
converting the detected change on the bases of the inductive measuring principle into the at least one redundant second electrical measuring signal, wherein the at least one second electrical measuring signal is generated and processed via the inductive measuring principle; and
evaluating the processed at least one first electrical measuring signal and the processed at least one second electrical measuring signal together for the redundant determination of the current angle of rotation of the rotatable body.

* * * * *